United States Patent Office 3,472,254
Patented Oct. 14, 1969

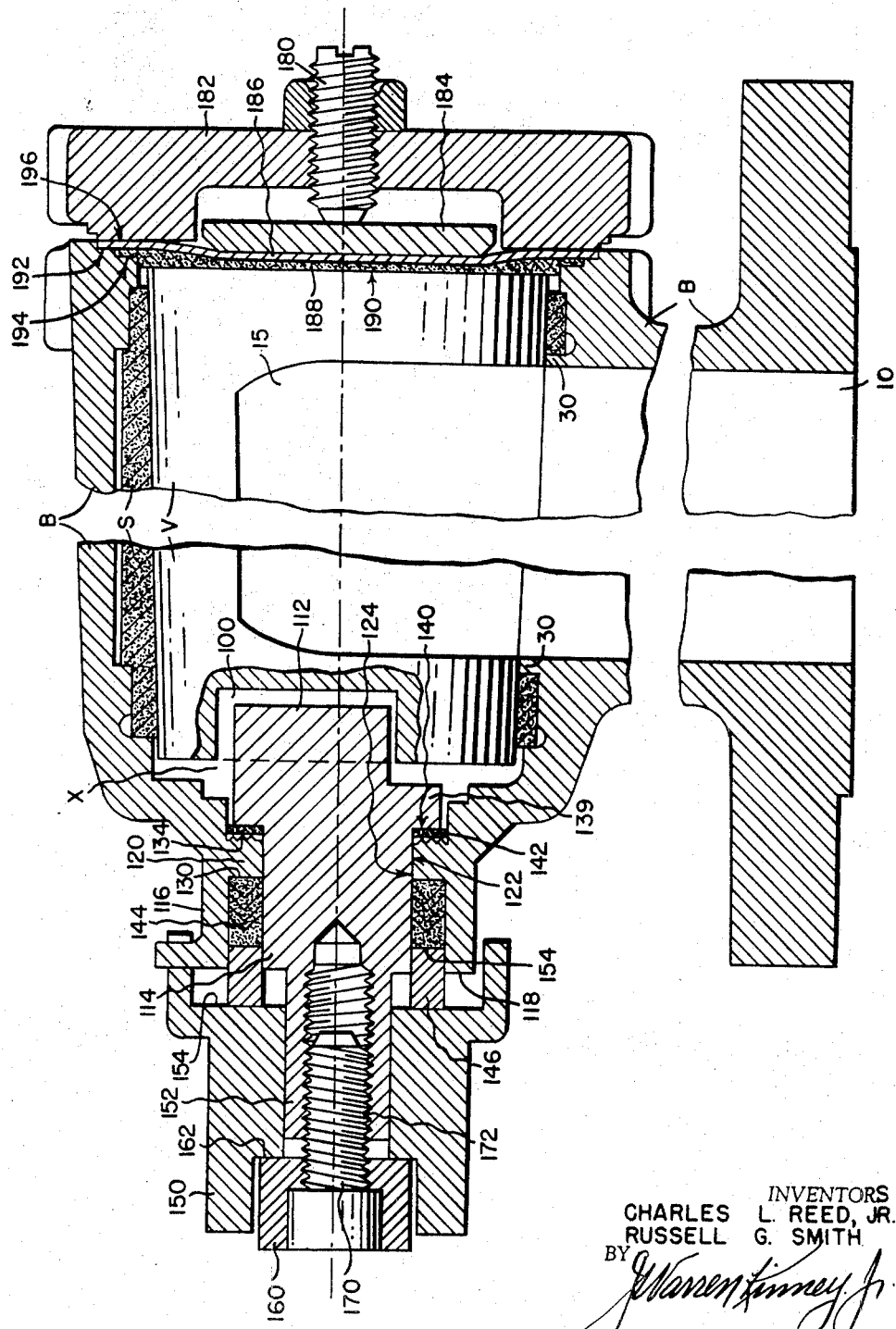

3,472,254
VALVE WITH DESTRUCTIBLE SEALING MEANS
Charles L. Reed, Jr., and Russell G. Smith, Cincinnati, Ohio, assignors to Continental Manufacturing Company, Cincinnati, Ohio, a corporation of Ohio
Original application Apr. 26, 1961, Ser. No. 105,592, now Patent No. 3,263,697, dated Aug. 2, 1966. Divided and this application Apr. 14, 1966, Ser. No. 643,741
Int. Cl. F16k 13/04, 17/14, 17/40
U.S. Cl. 137—72                                         3 Claims

ABSTRACT OF THE DISCLOSURE

The plug valve includes a rotary valving member and an associated actuating stem mounted within the valve body so that the stem has both rotational and limited axial motion. A metallic sealing face on the stem may move into contact with a metallic concentrically serrated sealing face on the body, incident to an axial shifting of the stem, whenever a destructible sealing element between said faces is vaporized by heat or the like.

---

This is a division of application Ser. No. 105,592, filed Apr. 26, 1961, now Patent No. 3,263,697, issued Aug. 2, 1966.

This invention relates to valves, and more particularly to a lined plug valve having a resilient sealing member interposed between the valving member and valve body.

An object of the invention is to provide a lined plug valve with simple yet highly effective means for anchoring a resilient sealing member relative to the valve body by means of radial port-defining lips which project through openings on the sealing member and extend toward the valving member. These lips effectively support the sealing member and provide a barrier which prevents a pressure differential from occurring between the inside and outside of the sleeve. Heretofore the accumulation of pressure media has caused sealing members to be distorted into the valve ports incident to operation of the valve.

A further object of the invention is to provide a lined plug valve with a one-piece resilient sealing member which is secured between the body and valving members in such a manner as to permit the use of a sealing member which is just thick enough to provide the desired spacing between adjacent faces of the body and valving members and which sealing member may therefore be used primarily as a lubricant.

A further object of the invention is to provide a lined plug valve wherein the body includes integral lips which project inwardly toward the valving member, and wherein the peripheral, valving-member-adjacent-faces of said lips comprise a valving surface or valve seat engageable, under certain conditions, by the valving member, per se, for providing an effective metal-to-metal seal between said lips and the valving member.

Still a further object of the invention is to provide a lined plug valve which is constructed in such a manner as to provide an effective valving element even though the sealing member or liner material initially disposed between the valving member and valve body should be volatilized or otherwise dissipated such as, by way of example, would occur when a valve is subjected to the heat of a fire or the like. This feature is of particular importance in those instances where valves are utilized to control such pressure media as hydrofluoric acid, rocket fuels, and other volatile, highly inflammable and/or inherently dangerous and explosive substances, which substances, but for certain novel features of the subject valve, would be free to escape from a conventional lined valve, in the event that the liner material was volatilized or otherwise dissipated while the valve was in use.

Another object of the invention is to provide a lined plug valve which includes lips which circumscribe the body ports and project inwardly toward the valving member whereby any throttling of pressure media being controlled by the valve will occur between the metal surfaces of the valving member and lips rather than between the valving member and the liner.

Still another object of the invention is to provide a lined plug valve in which the operating stem is separate from and mounted for independent axial movement relative to the plug or valving member, and wherein the operating stem is constructed in such a manner as to effect a metal-to-metal seal for precluding the escape of material being handled by the valve in the event that the valve is subjected to temperatures of such magnitude as to volatilize or otherwise dissipate heat-volatilizable packing or sealing material disposed between certain portions of the stem and body.

These and other objects are attained by the means described herein, and as disclosed in the accompanying drawing in which:

The figure is a section taken through the valve construction embodying the teachings of the present invention, wherein the operating stem is separate from the valving member.

With particular reference now to the drawing, the letter B denotes a body member, V a valving member, and S a resilient sealing member or sleeve which is interposed between the body and valving members.

In the figure, it will be noted that the upper end of the valving member V has been provided with a non-circular recess 100, and that a complementary plug or tongue 112 has been provided on the lower end of a separate operating stem 114.

The upper end of body member B is provided with a cylindrical packing chamber 116 open at its outer end 118 and terminating at its inner end in a radially inwardly projecting annular abutment 120 centrally bored as at 122 for receiving cylindrical portion 124 of the operating stem which is journaled therein.

Abutment 120 includes an upper axial face 130 and a lower axial face which in the preferred embodiment of the invention is provided with concentric serrations 134.

The cylindrical portion of the operating stem is provided with a radially outwardly extending annular flange 139, having an axial face 140.

An annular resilient sealing element 142 is disposed between and in contacting relationship with the adjacent axial faces 134 and 140 of the body and stem members.

Resilient sealing means 144 is housed within chamber 116 beneath an annular compression member 146.

The numeral 150 denotes an operating nut which is secured to and carried by the upper cylindrical portion 152 of the operating stem. Lower face 154 of the operating nut engages the upper face of compression member or metallic spacer ring 146, the lower face of which engages the upper end of packing material 144 within the packing chamber 116. A thrust collar 160 engages the upper end of the operating nut as at seat 162 whereby axial movement of cap screw 170 into internally threaded bore 172 of the operating stem will simultaneously exert an upward force to flange 139 of the operating stem for tightly compressing the resilient sealing element 142 between axial faces 140 and 134 while the compression member 146 exerts a downward force on packing 144.

In the event that the valve structure shown on the drawing should be subjected to heat sufficient to dissipate the sealing element 142 and sealing member S, pressure on the upstream face R of the valving member would bodily shift the valving member in a lateral direction whereby to engage the lips which define the downstream or outlet port of the body. Such lateral movement of valving member V will permit the fluid media to enter into and fill area X resulting in the application of a positive outward thrust to the operating stem which will be shifted axially whereby a metal-to-metal contact will be established between axial face 134 of the body member and axial face 140 of the operating stem for thereby effectively precluding the escape of fluid media from the valve body upwardly along the operating stem.

The opposite end of the valve may, by way of example, be constructed as illustrated in the figure; it being understood that the annular resilient sealing element 142 would be seated upon axial face 140 of the actuator stem flange 139 after which the actuator stem would be inserted into the body member from that end opposite the cylindrical packing chamber 116.

Valving member V would then be introduced into the body member, sealing member S having already been associated with the body member.

A set screw 180 threadably engages end plate 182 for applying an axial force to pressure plate 184 which abuts against a metallic diaphragm 186 which backs up a resilient diaphragm 188 of sealing material, surface 190 of which engages end 192 of the valving member V.

The peripheral edges of the diaphragm 186 and 188 are received within suitable annular seats 192 and 194 of the body member whereby to be securely though releasably locked in sealing relationship with the body member incident to the application of an upward axial force by seat 196 of the end plate 182, by suitable means, not illustrated.

From the foregoing, it will be noted that we have provided a lined plug valve which is particularly adapted to safely handle pressure media subjected to high pressures and over high temperature ranges.

The sealing member is reinforced in such a manner by lips 30 as to enable us to utilize the sealing member for its inherent lubricating or bearing area characteristics, in addition to its sealing characteristics. The lips effectively preclude the application of pressure differentials to the sleeve material and they also localize any throttling action of pressure media which might occur incident to opening and closing the valve to occur between the metallic surfaces of the lips of the body member and the valving surface of the valving member.

It should also be noted that our valve will effectively maintain pressure media against accidental or unintentional escape from the valve body even though the valve should be subjected to external heat of such intensity, as during a fire, as to volatilize or otherwise dissipate the sealing member S, or the sealing member S and/or sealing element 142. Under such conditions the valving member, per se, would be laterally moved for providing a metal-to-metal, pressure-media-sealing contact with the seating surface of lips 30 of the outlet port—or in the event of a pressure reversal, with the seating surface of lips 30 of the inlet port.

In the figure the separable operating stem 114 will be shifted axially incident to dissipation of sealing element 142 for effecting a metal-to-metal, pressure-media-sealing contact between axial faces 134 of the body member and 140 of the stem for precluding the passage of pressure media from the body member via stem 114.

Dissipation of the resilient sealing disc 188 will not result in the escape of pressure media from the body member, since a pressure-media-sealing metal-to-metal contact is always present at the peripheral edge of the metallic diaphragm 186 between body seat 192 and closure plate face 196.

Uniformly satisfactory results have been obtained in those instances in which the sealing member S, sealing element 142, sealing disc 188 and sealing material 144 has been fabricated from materials of the polyethylene group, particularly the halogenated ethylene which are characterized by outstanding resistance to corrosives and solvents and which have extremely low coefficients of friction. Polytetrafluoroethylene, which is commercially known and available as Teflon, is such a material from which we have fabricated the various sealing members of our valves, with excellent results. Such sealing substances will be completely volatilized and dissipated incident to the application of heat such as, by way of example, would occur if a lined valve were subjected to a fire.

We claim:

1. In a valve, a body member and a valving member, each of said members including flow passages, means mounting said valving member for rotary movement relative to said body member to place the flow passages of said valving member in and out of communication with the flow passages of said body member, an elongate operating stem, means mounting said operating stem upon said body member for rotary movement and for limited axial movement relative to the body member, means, interconnecting said valving member in driven relationship with said stem, said stem and body member including opposed metallic axial faces concentric with respect to the stem axis and relatively movable into flatwise contact with one another, one of which faces is provided with serrations concentric with respect to the stem axis, a resilient, heat dispersable sealing element interposed between said opposed axial faces, said stem having a threaded axial bore and means cooperating therewith for adjusting the pressure on said sealing element, said operating stem acting when shifted axially to dispose said axial faces in direct, contacting relationship incident to dissipation of said sealing element for providing a metal-to-metal seal including said serrations.

2. The valve according to claim 1, wherein said interconnecting means for driving the valving member includes a lost-motion connection permitting axial shifting of the stem independently of the valving member.

3. The valve according to claim 2, wherein said heat dispersable sealing element is formed of a material of the class of polytetrafluoroethylene.

References Cited

UNITED STATES PATENTS

| | | | |
|---|---|---|---|
| Re. 17,724 | 7/1930 | Nordstrom | 137—246.18 |
| 2,647,721 | 8/1953 | Volpin | 137—72 |
| 2,803,426 | 8/1957 | De Zurik | 251—309 XR |
| 3,030,068 | 4/1962 | Priese | 251—214 |
| 3,177,887 | 4/1965 | Priese | 137—74 |
| 3,231,235 | 1/1966 | Anderson et al. | 251—214 |
| 1,679,779 | 8/1928 | Oberhuber | 277—207 XR |
| 2,868,499 | 1/1959 | Kaminsky | 251—314 |

WILLIAM F. O'DEA, Primary Examiner

R. GERARD, Assistant Examiner

U.S. Cl. X.R.

277—26, 60, 64, 207